United States Patent Office 3,230,699
Patented Jan. 25, 1966

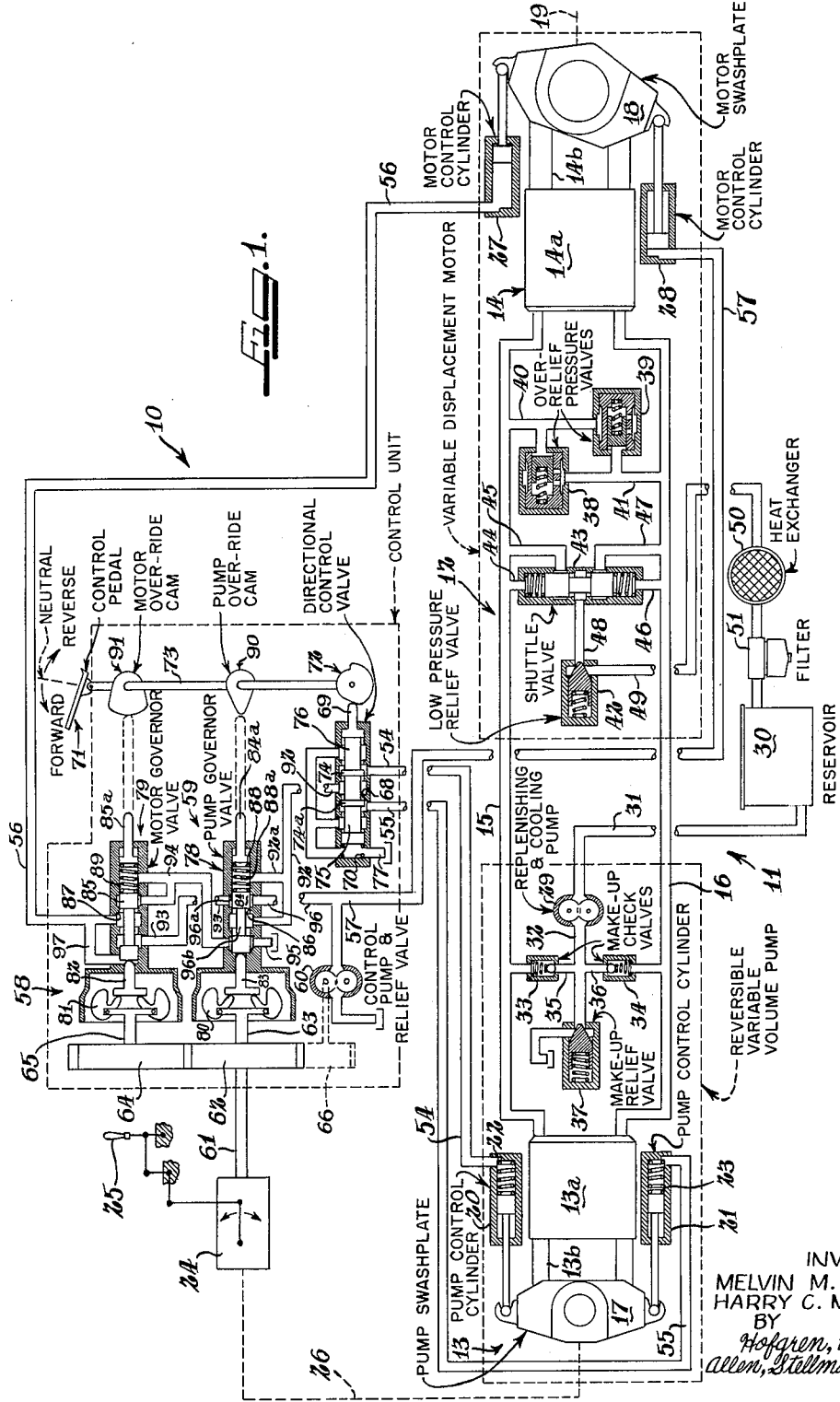

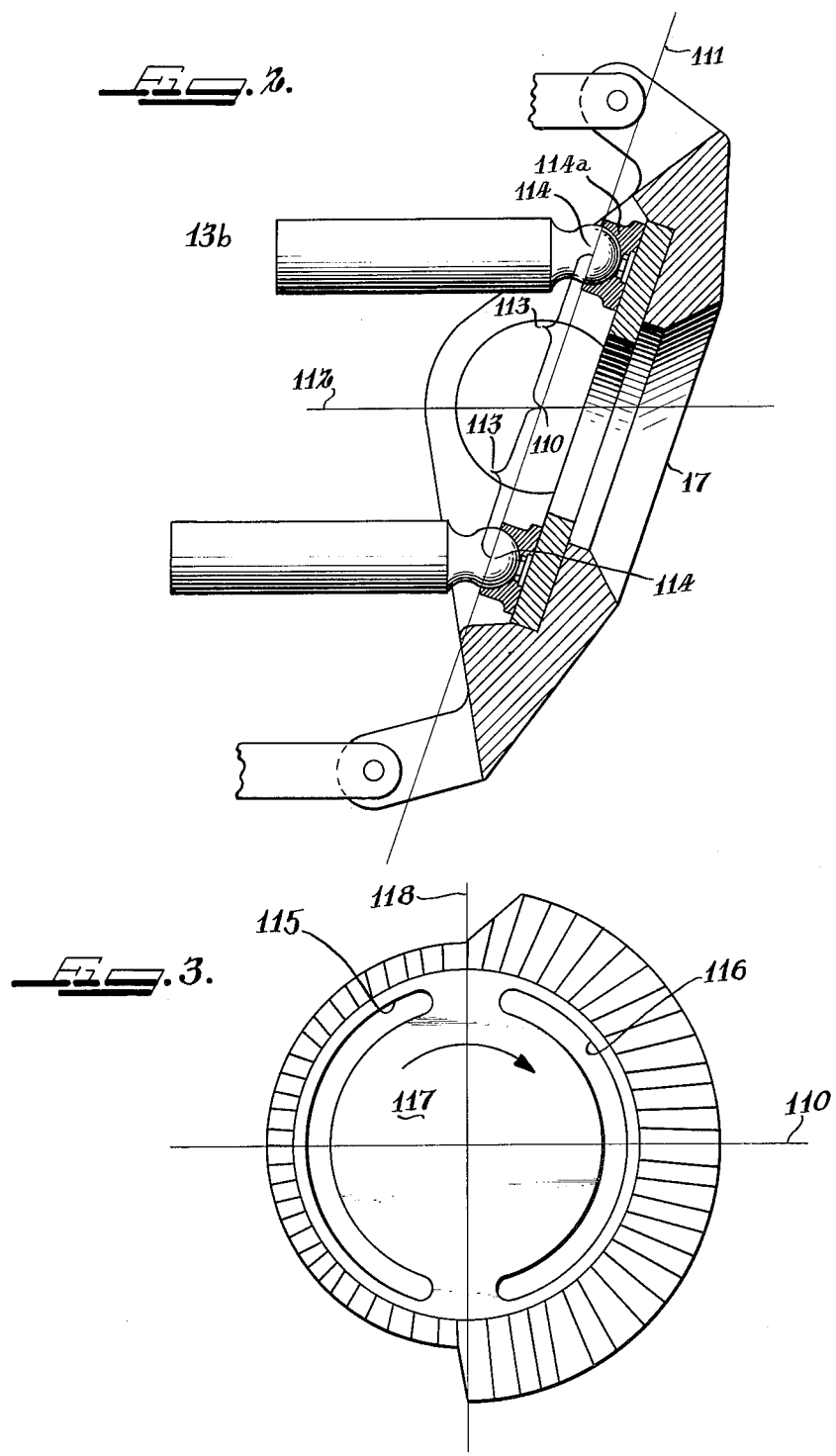

3,230,699
HYDROSTATIC TRANSMISSION
Melvin M. Hann and Harry C. Moon, Jr., Rockford, Ill., assignors to Sundstrand Corporation, a corporation of Illinois
Filed Jan. 21, 1964, Ser. No. 339,238
25 Claims. (Cl. 60—19)

This application relates to hydrostatic transmissions, and more particularly, to a control system therefor.

Hydrostatic transmissions are particularly suitable for use with hard working, slow moving type vehicles where precise control in close working quarters is often necessary. Such vehicles include lift trucks and shovel loaders which have powered accessories to be driven by the prime mover as well as the vehicle itself. In such vehicles it is desirable to permit an efficient transfer of power to the wheels of the vehicle over a wide range of engine speeds with varying vehicle speed. It is further desirable that the transmissions have a control which permits the engine to be operated at a maximum r.p.m. for maximum horse power to supply power to the work function of the vehicle while providing for smooth and precise control of the flow of power to the wheels for propelling.

Certain forces act on the swashplate of an axial piston type pump or motor which, in the case of a pivotally mounted swashplate, cause difficulty in positioning the swashplate in a preselected position. These forces are more pronounced at high pressures and are produced by the combination of the compressibility of fluid and the shock wave produced at the valving crossover point between the arcuate ports of the valve plate. In the case of a pump the net effect of the forces is stroke reducing and in the case of a motor, the net effect of the forces is stroke increasing. This effect has been described as the bulk modulus moment. Previous efforts have been made to eliminate these forces, an example of which is disclosed in the copending application of Hann, et al., Serial No. 113,697, filed May 31, 1961, and assigned to the assignee of this invention. Rather than undertaking the problem of eliminating these difficulties, it would be desirable if a use for such forces could be found.

It is a general object of this invention to provide a new and improved control means for a hydrostatic transmission.

It is a primary object of this invention to provide a new and improved control means for a hydrostatic transmission which possesses the desirable characteristics mentioned above.

It is another object of this invention to provide a new and improved control means for a hydrostatic transmission having an engine driven pump, a pump driven motor, and an engine driven control unit for controlling the speed of the vehicle in response to engine sped.

It is still another object of this invention to provide a new and improved control means for a hydrostatic transmission having an engine driven pump, a pump driven motor, and an engine driven control unit for controlling the speed of the vehicle in response to engine speed, and manually operable means for overriding the engine driven control unit for varying the speed of the vehicle independently of the engine speed thereof.

It is a further object of this invention to provide a new and improved control means for a hydrostatic transmission having an engine driven pump, a pump driven motor, and an engine driven control unit for controlling the speed of the vehicle in response to engine speed and means responsive to the bulk modulus moment of the transmission fluid to vary the displacement of one of the pumps and motors at extremely high pressures to increase the torque output of the transmission and prevent vehicle stalling in response to heavy load conditions imposed thereon.

Further objects and advantages will become apparent from the following detailed description taken in connection with the accompanying drawings, in which:

FIG. 1 is a diagrammatic illustration of a hydrostatic transmission embodying the principles of this invention;

FIG. 2 is a diagrammatic vertical sectional view of a portion of the pump in a forward pumping position; and FIG. 3 is a diagrammatic illustration of pump valving associated with a pressure graph.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the inevtnion will be pointed out in the appended claims.

Referring now to the drawings, a form of control means 10 of this invention is shown in use with a hydrostatic transmission 11 including a closed hydraulic circuit 12 having an engine driven pump 13 and a pump driven motor 14. The pump and motor are hydraulically connected by conduits 15 and 16 to establish a closed circuit for pumping the hydraulic fluid fro mthe pump 13 to the motor 14 and returning the same thereto.

Preferably, both the pump and motor are of a well-known axial piston type and also of the variable displacement type having a pump swashplate 17 variable in opposite directions from neutral and a motor swashplate 18 variable in one direction from neutral. The pump includes a rotatable cylinder block 13a with an annular series of axial pistons 13b engaging swashplate 17. Similarly, the motor includes a rotatable cylinder block 14a with an annular series of axial pistons 14b engaging swashplate 18. The combination of the variable displacement pump and variable displacement motor gives the transmission the capability of delivering a fixed or variable torque on the output shaft 19 which permits an infinite number of power output characteristics. Furthermore, the transmission may be fully reversible from full speed in one direction, to neutral, and then full speed in the other direction, and dynamic braking is provided.

The pump swashplate is provided with two opposed similar control cylinders 20 and 21 each of which is spring centered by the centering springs 22 and 23, respectively, to normally position the pump swashplate as shown in FIG. 1 in neutral or minimum displacement position. The control cylinders are of the conventional single action type so that fluid under pressure in one cylinder will cause the swashplate to tilt in a given direction and fluid under pressure in the opposite cylinder will cause a reverse tilting so that movement in opposite directions may be imparted to the motor and to the wheels of the vehicle driven thereby. A prime mover, such as conventional engine 24, manually controllable by an appropriate throttle lever 25 and mechanically connected through suitable means schematically illustrated by the line 26, is used for driving the pump.

Motor 14 is provided with a pair of opposed control cylinders 27 and 28. One of the cylinders, such as 28, has a smaller diameter and when supplied with full fluid control pressure, urges the swashplate toward its minimum displacement position. The other cylinder is of larger diameter, such as 27, and when pressurized, can overcome the small cylinder to move the motor swashplate toward maximum displacement for maximum torque, as shown in the drawings.

The transimssion is provided with a positive displacement gear-type replenishing and cooling pump 29 which is also driven by the prime mover 24. The replenishing and cooling pump 29 is in communication with a reservoir 30 through a supply conduit 31 for supplying replenishing and cooling fluid to the system by means of an exhaust conduit 32. Spring-biased check valves 33 and 34 are provided and are in communication with the exhaust conduit 32 and with the conduits 15 and 16, respectively, by means of the conduits 35 and 36, respectively, for supplying replacement fluid to the low pressure side of circuit 12 through one of the check valves while pressure in the high pressure side of the circuit maintains the other check valve closed. A spring-biased make-up relief valve 37 communicates with the conduit 32 and removes the excess fluid pumped by the pump 29 and conduits the same to drain into the reservoir when the transmission is in neutral. The capacity of the pump is sufficient to replace leakage fluid, and to supply cooling fluid to circuit 12 in excess of that required for make-up. The excess fluid displaces heated fluid and maintains the transmission cool.

For establishing a circuit between the main line 15 or 16 which is at low pressure and a low pressure heated fluid relief valve 42, a shuttle valve 43 is provided. The shuttle valve is in communication with the lines 15 and 16 by means of the conduits 44, 45, and 46, 47, respectively, and provides a means for removing excess heated oil displaced by cooling oil supplied by the replenishing pump. The fluid pressure in the conduits 15 and 16 appropriately positions the shuttle valve to establish communication with the low pressure relief valve by the means of the conduit 48 so that the low pressure relief valve may conduit the heated fluid by means of the conduit 49 through the heat exchanger 50 and filter 51 and into the reservoir 30. The shuttle valve is spring centered to a closed position so that during reversing of pressure in the main lines 15 and 16, none of the high pressure oil is lost from the circuit.

The transmission is further provided with two spring-biased overpressure relief valves 38 and 39 which are in communication, respectively, with the main conduit lines 15 and 16 by means of the conduits 40 and 41, respectively. The purpose of valves 38 and 39 is to prevent extremely high abnormal pressure in either of the two main hydraulic lines by relieving the circuit of surge pressures which may occur during rapid acceleration or abrupt braking. In response to high pressure, the overpressure relief valves 38 and 39 shift to dump the excess oil to the low pressure side of the transmission. For example, on the occurrence of such high pressures in line 15, pressure in conduit 40 actuates valve 38 to relieve the pressure through conduit 41 to line 16.

Two sets of conduits establish communication between the transmission and the control unit of this invention. Conduits 54 and 55 establish communication between the pump control cylinders 20 and 21, respectively, and the control unit. Similarly, conduits 56 and 57 establish communication between the motor control cylinders 27 and 28, respectively, and the control unit. Included in the control unit are a motor governor 58 and a pump governor 59 as well as a control pump 60. These three components are engine driven by means of an engine shaft schematically represented at 61 which rotates the pump governor gear 62 and pump governor drive shaft 63 to in turn rotate the meshing motor governor gear 64 and its associated motor governor drive shaft 65. Gear 66, meshing with gear 62, drives pump 60.

The control pump 60 pumps control fluid under pressure to the motor control cylinders 27 and 28 under control of a motor governor valve 79 and to the pump control cylinders 20 and 21 through a pump governor valve 78 and a directional control valve 67.

The directional flow valve 67 includes a valve housing 68, a valve stem 69 and a compression spring 70. The control valve is mechanically linked with a control pedal 71 by means of a control valve cam 72 secured to one end of a cam shaft 73 which is also secured to the control pedal 71. The control valve cam 72 engages the control valve stem 69 so that appropriate pivotal movement of the control pedal 71 will effect a lateral movement of the control valve stem 69.

When the control pedal 71 is positioned at neutral, the spring 70 positions the valve stem 69 so that the lands 74a and 74 and reduced portions 75 and 76 thereof permit fluid communication between the pump control cylinder conduits 54 and 55 and a control valve drain conduit 77 while blocking the cylinders from pressure fluid. Fluid is exhausted from the pump control cylinders 20 and 21, thereby placing the swashplate at a minimum displacement position so that the pump has no positive output. When the control pedal is depressed in the direction indicated as "forward," the shaft 73 will be turned so that a low concentric portion of cam 72 will abut valve stem 69, permitting it to move to the right so that land 74 is moved away from its position blocking flow to conduit 54. Fluid is then permitted to flow from a pressure conduit 92 through conduit 54 to the pump control cylinder 20 where it will cause the pump swashplate to tilt to the left (as shown in the drawing) so that the vehicle may move in a forward direction, motor swashplate 18 being in the inclined position shown.

The pump governor valve 78 and motor governor valve 79 control the angles of the associated swashplates. The pump governor and motor governor valves are provided with governor flyweights 80 and 81, respectively, which are pivotally mounted on the shafts 63 and 65 and adapted to spread out in conventional flyweight fashion as the speed of the shafts is increased in response to increase of speed of the engine 24. As the flyweights spread out in response to increase in the speed of the engine, flyweight plungers 82 and 83 are pushed by flyweight arms to move axially to the right in the figure to impart axial movement to valve stems 84 and 85 of the pump governor valve 78 and motor governor valve 79, respectively. Plungers 82 and 83 abut stems 84 and 85, respectively, at one end thereof.

The valve stems 84 and 85 are slidably positionable in respective valve housings 86 and 87 and are adapted to appropriately meter fluid under pressure by cooperation of suitable lands and reduced portions in the valve stems and suitable grooves in the valve housings. Each valve is provided with a compression spring 88 or 89, abutting the other ends of stems 84 and 85, respectively. Each spring 88 and 89 exerts a force in opposition to the flyweights and tends to maintain the valve stems in a neutral position when the engine 24 is inoperative. The springs abut pistons 84a and 85a which have stems projecting outwardly from the valves and engage motor and pump override cams 90 and 91, respectively, which are mounted on the shaft 73 for operation by the control pedal 71.

The several valves and control cylinders are operatively connected by suitable conduits. As previously mentioned, the conduits 54 and 55 establish communication between the pump control cylinders and the directional control valve, and the conduits 56 and 57 establish communication between the motor control cylinders and the control pump 60. In addition, conduit 92 establishes supply communication between the control valve 67 and the pump governor valve, and a conduit 93 establishes supply communication between the pump governor valve and the motor governor valve. A conduit 94 establishes a drain connection between the motor governor valve and the pump governor valve, and a conduit 95 leads from the pump governor valve to drain. The control pump communicates with the conduit 56 through a conduit 96 which runs from the pump to the pump governor valve for communication therethrough with a conduit 93. Conduit 93 extends to the motor governor valve for valved communication therethrough with conduit 56.

When the engine 24 is at rest, the pump and motor governor valve springs 88 and 89 push the pump and motor valve stems 84 and 85 to the left (as shown in the drawing). In the position shown, fluid is supplied to the motor control cylinder 27 from the control pump 60 by means of the conduit 96, an annular groove 96a of the pump governor valve bore, the conduit 93, a reduced portion of the motor governor valve stem, and the conduit 56.

The conduit 57 is constantly open to the control pump 60 so that fluid is continuously supplied to the motor control cylinder 28. Since the motor control cylinder 27 is of larger diameter than the motor control cylinder 28, the cylinder 27 will act in response to the control fluid to tilt the motor swashplate to a position of maximum displacement for maximum torque, as shown in FIG. 1. As previously described, when the control pedal is in neutral, the pump swashplate will be maintained in an upright position as shown in the drawing. Thus, when the engine 24 is at rest and the control pedal 71 is in a neutral position, the pump swashplate will be positioned for minimum displacement and the motor swashplate will be positioned for maximum displacement and maximum torque as shown in the drawing.

To drive the vehicle, the operator first starts the engine and then selects the desired direction of travel by depressing the control pedal 71 in the appropriate direction. Movement of the control pedal appropriately actuates the directional control valve. The operator then advances the engine throttle and, through the governor means, the pump proportionately increases in displacement with the engine speed so that the pump reaches maximum displacement when the engine reaches maximum torque.

When the engine 24 is started, it causes the pump governor valve flyweights 80 to move outwardly to force the flyweight shaft 83 against the valve stem 84, forcing the stem to the right. This permits control fluid to flow from the pump 60 through the conduit 96 and into the pump governor valve, past a reduced portion 96b of the valve stem 84 and through the conduit 92 to the directional control valve. Selected actuation of the control pedal will direct the control fluid from the directional control valve to the appropriate pump control cylinder 20 or 21 for tilting the pump swashplate 17 to achieve the desired directional output for the pump. As the speed of the engine 24 increases, the pump governor valve stem will be moved further to the right to supply more control fluid through the directional control valve to the pump control cylinder. By means of conduit 92a, spring chamber 88a is subjected to the same fluid pressure as the pump control cylinder, and this tends to counterbalance the force of the flyweights. The counterbalancing urges the valve stem 84 to valve closed position, providing a feedback of the input signal. The governor valve is designed to permit the pump swashplate to reach a position of full pump displacement at the time the engine reaches maximum torque.

In operation, when the engine is started, the motor swashplate is in a position for maximum motor displacement and the motor governor valve spring 89 is designed to hold the valve stem in a position to continue this maximum swashplate displacement until the engine reaches approximately one-third of the speed range between idle and full speed with pressure in line 97 acting behind valve member 85 and opposing spring 89. When the engine speed passes one-third, the governor weights and fluid pressure begin to overcome the spring 89 and the flyweight shaft 82 forces the valve stem 85 to the right, blocking the flow of fluid from the conduit 93 and opening the exhaust conduit 94 so that fluid from the control cylinder 27 is drained from the conduit 56 through the conduit 94 and out the pump governor valve by means of the conduit 95. The motor control cylinder 28, which has a constant supply of fluid under pressure, begins to take effect and position the motor swashplate uprightly as engine speed is increased and more fluid is drained from the cylinder 27. As the valve stem 85 moves to the right, the pressure of fluid in lines 56 and 97 diminishes, allowing the spring to counterbalance the valve stem for a feedback signal.

To decelerate the vehicle, the operator merely moves the engine throttle back towards idle, and the governor valves increase motor displacement and then decrease pump displacement. This requires the pump to absorb the motor flow, thus obtaining engine braking. The rate of deceleration will be controlled by the rate the operator returns the engine throttle control and how fas the engine decelerates, and in the case of a very abrupt stop, by the braking and overpressure valves.

The control pedal 71, shaft 73, motor override cam 91 and pump override cam 90 provide a means for overriding the force of the governor flyweights to reposition the motor governor valve and pump governor valve to establish a desired output speed of the transmission, as where the operator desires to use the engine at a higher speed than required for propelling to obtain additional power to do other work. As the control pedal 71 is actuated for override by moving the pedal toward neutral, both the motor override cam and the pump override cam will appropriately move the respective value stems to the left in opposition to the flyweights so that, at a given engine speed, the motor swashplate angle will be positioned for greater motor displacement to produce increased motor torque and the pump swashplate will be brought to a position of reduced pump displacement to reduce the volume of fluid pumped thereby. The motor cam 91 has a longer high cam portion than the pump cam 90 so that as the shaft 73 is turned, the high portion of cam 91 will cause lateral movement of the motor valve stem while the pump valve stem end 84a is still abutting the low portion of cam 90. Thus, the cams are appropriately designed so that the override will control in stages to first place the motor in maximum displacement and then reduce the pump displacement.

With particular reference to FIGS. 2 and 3, as disclosed in the copending application previously mentioned, a force which acts on a motor or pump swashplate is the bulk modulus moment due to compressibility of the fluid on crossover of the cylinders from low to high pressure. At high pressures, this force tends to move the swashplate in a stroke reducing direction in a pump and in a stroke increasing direction in a motor. The bulk modulus moment may be explained as follows. Assuming the pump swashplate 17 shown in FIG. 2, which is representative of the pump and motor herein, is mounted to pivot about an axis as at 110 intersecting the drive shaft axis 112 at right angles where the drive shaft axis pierces the plane containing the centers of the spherical piston ends 114 carrying universal bearing slippers 114a, at high pressures the net bulk modulus moment acting through the pistons 13b tends to rotate the swashplate about its pivotal axis in a stroke reducing direction. More specifically, the hydraulic forces acting through each piston 13b on the swashplate are in the direction of the longitudinal axis of the piston and act through the pivot center 114. Theoretically, the longitudinal forces of all pistons above the axis 110 are equal to the longitudinal forces of all pistons below axis 110. However, in actual use, particularly at high pressure, these theoretically equal forces are found to vary due in part, at least, to the compressibility of hydraulic fluids at high pressures. That is, as each piston starts on its pumping stroke, there tends to be some fluid compression before maximum pressure is obtained, so that the pressure rise on the piston is somewhat gradual rather than instantaneous, whereas on crossover from the high pressure port 116 to the low pressure port 115, the drop in pressure is almost instantaneous. The graph in FIG. 3 illustrates the net effect during forward pumping, that is, with the cylinder block, when viewed from the left end of FIG. 2, rotatable in a clockwise direction as indicated by the arrow in FIG. 3, and the swashplate inclined as in FIG. 2. The pressure force is indicated by the shaded area surrounding valve plate 117. The average pressure force above the swashplate axis 110 is less than the average pressure force below this axis, resulting in a stroke reducing pressure moment on the pump swashplate. When the pump is pumping in a reverse direction, that is, with the swashplate inclined over center in the opposite direction, the graph is rotated 180° in the plane of the paper, and a net stroke reducing pressure moment is still produced. In the case of a motor, with a swashplate inclinable in only one direction from neutral, say the direction shown in FIG. 2 for purposes of this example, and a cylinder block rotatable in opposite directions, the graph for forward motoring is similar to that for reverse pumping and the graph for reverse motoring is flopped 180° about axis 118 from that of forward motoring. In each case, the net effect is stroke increasing.

In the aforementioned copending application, steps were taken to compensate for the bulk modulus moment. According to the present invention, use is made of the moment.

As was previously described, the lower motor control cylinder 28 is constantly supplied with control fluid acting on the piston thereof to tend to position the swashplate toward minimum displacement. The motor control cylinder and piston are appropriately sized to be capable of holding the motor swashplate in minimum displacement until the pressures in the motor which act upon the swashplate rise to a predetermined value. At this point the fluid pressure moment effect of the high pressure fluid acts on the motor swashplate through the pistons to urge the motor swashplate in a stroke increasing direction toward a position of maximum motor displacement. Thus, if the torque requirement on the motor is high, the motor will move to full displacement, or it can modulate, advancing toward maximum until, by the pressure rise of the system and increased displacement of the motor, the torque requirement is met. Movement of the control piston in cylinder 28 against the pressure of fluid acting against it is permitted by a relief valve associated with control pump 60 and/or leakage, as past the piston.

The pump control cylinders are also sized so that the bulk modulus moment effect can automatically position the pump swashplate in response to high pressures. Preferably, the motor cylinders are sized to allow the motor swashplate to be positioned in a maximum displacement position first in response to the bulk modulus moment after which, under a heavy load condition, the pump control cylinders would begin to position the pump swashplate toward minimum displacement. Thus, the motor would react first to an extremely high pressure condition and move toward maximum displacement and then, if the motor, at such a displacement and under such pressure, could not deliver the torque to the system, the pressure would continue to rise. The pump would then begin to reduce its displacement reaching zero or minimum displacement at the maximum allowable system pressure. Thus, the system would stall out with the pump near neutral maintaining maximum pressure on the motor, and the motor in turn capable of delivering its maximum torque. Movement of either pump control piston against the pressure of fluid acting against it is permitted by leakage through normal leakage paths, as past the control piston itself and in the control valve.

We claim:

1. In a vehicle drive system, in combination, a variable displacement pump, a variable displacement motor, conduit means connecting the pump outlet with the motor inlet and connecting the motor outlet with the pump inlet, hydraulic means for varying the displacement of the pump, hydraulic means for varying the displacement of the motor, an engine for driving the pump, means for controlling engine speed, means for sensing engine speed, and means responsive to said sensing means for controlling the flow of fluid under pressure relative to both displacement varying means to increase pump displacement and reduce motor displacement to bring the transmission up to speed as the engine is brought up to speed.

2. In a hydrostatic transmission system drivable by a variable speed prime mover, in combination, a variable displacement pump, an input shaft for driving said pump adapted to be driven by the prime mover, a variable displacement motor, means including conduit means connecting the pump and motor for driving said motor by said pump, means responsive to hydraulic pressure for varying the displacement of the pump, means responsive to hydraulic pressure for varying the displacement of the motor, and rotary governor means for sensing input shaft speed and controlling hydraulic pressure for each displacement varying means to increase pump displacement and reduce motor displacement to bring the transmission up to speed.

3. The hydrostatic transmission system of claim 2 including automatic overpressure means responsive to high pressure in the conduit means to decrease pump displacement and increase motor displacement.

4. The hydrostatic transmission system of claim 2 including override means for overriding said governor to reverse the displacement varying means to reduce transmission speed for a given input shaft speed.

5. The hydrostatic transmission system of claim 4 including means for controlling directional output of the transmission.

6. The hydrostatic transmission system of claim 5 wherein said override means includes means operably associated with said means for controlling transmission direction.

7. In a hydrostatic transmission system, in combination, a variable displacement pump adapted to be driven by an engine, a variable displacement motor, conduit means connecting the pump outlet with the motor inlet and connecting the motor outlet with the pump inlet, hydraulic means for varying the displacement of the pump and motor, means for controlling engine driving speed, and governor means for sensing engine speed and controlling the flow of fluid under pressure relative to the displacement varying means to increase pump displacement and reduce motor displacement to bring the transmission up to speed, said governor means including valve means for controlling the flow of control fluid relative to the displacement varying means to vary the displacement of the pump and further including a rotary means adapted to be driven by said engine for positioning said valve means in response to engine speed.

8. The hydrostatic transmission system of claim 7 including a directional control valve for controlling the direction of pump displacement, and manually operable means for controlling the directional control valve for controlling the output direction of the transmission.

9. The hydrostatic transmission system of claim 8 including override means for overriding said governor to reverse the displacement varying means to reduce the transmission speed for a given engine speed, said override means including cam means on said manual control means adapted for selective engagement with said governor valve means to position the same in opposition to said governor rotary means.

10. The hydrostatic transmission system of claim 7 including automatic overpressure means responsive to high pressures produced in said transmission when extreme loads are placed thereon for automatically reducing the pump displacement and increasing the motor displacement.

11. In a vehicle drive system, in combination, a reversible variable displacement swashplate pump, a variable displacement swashplate motor, conduit means connecting the pump outlet with the motor inlet and connecting the motor outlet with the pump inlet, hydraulic means for varying the displacement of the pump, hydraulic means for varying the displacement of the motor, an engine for driving the pump, means for controlling engine speed, directional control valve means for operatively positioning said pump swashplate to pump fluid in the desired direction for desired vehicle movement, rotary governor means responsive to engine speed for controlling the flow of fluid under pressure relative to both displacement varying means to increase pump displacement and reduce motor displacement to bring the transmission up to speed, said rotary governor means including pump governor means for controlling the flow of control fluid to the pump displacement varying means to vary the displacement of the pump, said pump governor means including a pump governor valve and a pump rotary governor operatively associated with said engine for positioning said pump governor valve in response to engine speed; said rotary governor means further including motor governor means for controlling the flow of fluid to the motor displacement means to vary the displacement of the motor, said motor governor means including a motor governor valve and a motor rotary governor operatively associated with said engine for positioning said motor governor valve in response to engine speed.

12. The vehicle drive of claim 11 wherein said hydraulic means for varying the displacement of the motor includes a pair of opposed control cylinders at either end of the motor swashplate, one of said cylinders being larger than the other of said cylinders and adapted to maintain the motor swashplate in a position of maximum displacement when the transmission is at rest, the other cylinder adapted to move the swashplate toward minimum displacement in response to said motor governor means and being sized relative to the inherent system pressure to be capable of maintaining the swashplate in a position of minimum displacement when system pressure is below a predetermined pressure value and yielding when system pressure exceeds the predetermined value so that the bulk modulus effect produced on the swashplate above the predetermined value will tend to move the swashplate toward maximum displacement in opposition to the motor governor valve to compensate for the high pressures existing in the transmission to prevent stalling thereof.

13. A vehicle drive system, comprising, a reversible swashplate variable displacement pump, a variable displacement motor, conduit means connecting the pump outlet with the motor inlet and connecting the motor outlet with the pump inlet, hydraulic means for varying the displacement of the pump, hydraulic means for varying the displacement of the motor, an engine for driving the pump, means for controlling engine speed, a directional control valve for operatively positioning the pump swashplate to pump fluid in the desired direction for desired vehicle movement, a manually operable lever for appropriately positioning the control valve, rotary governor means responsive to engine speed for controlling the flow of fluid under pressure relative to both displacement varying means to increase pump displacement and reduce motor displacement to bring the transmission up to speed, said rotary governor means including pump governor means for controlling the flow of control fluid to the pump displacement means to vary the displacement of the pump, said pump governor means including a pump governor valve and a pump rotary governor operably associated with said engine for positioning said pump governor valve in response to engine speed; said rotary governor means further including motor governor means for controlling the flow of fluid to the motor displacement means to vary the displacement of the motor, said motor governor means including a motor governor valve and a motor rotary governor operatively associated with said engine for positioning said motor governor valve in response to engine speed; and override means for overriding said governor to reposition said pump governor valve and said motor governor valve independently of said engine speed, said override means including cam means on said directional control valve lever adapted to engage said motor and said pump governor valve stems to reposition the same in opposition to said governor means.

14. A hydrostatic transmission and prime mover responsive control system therefor, comprising a variable displacement pump drivable by a prime mover, a variable displacement motor driven by said pump, means for varying the displacement of the pump, means for varying the displacement of the motor, means for actuating each of said displacement varying means, means for controlling the prime mover driving speed, operative means for controlling the direction of pumping action of said pump, means responsive to prime mover driving speed controlling said actuating means to actuate each of said displacement varying means responsive to prime mover driving speed including separate means acting on each of said actuating means for reducing motor displacement responsive to driving speed for bringing the transmission up to speed and for varying pump displacement directly responsive to driving speed, and selectively manually operable override means movable in either of two directions and associated with said operative means for directly controlling said actuating means and operative means to stage said tranmission in either direction of transmission output, said manually operative means being adapted to control said actuating means to place said motor in maximum displacement responsive to operation of said manually operative means and to sequentially thereafter reduce pump displacement.

15. In a hydrostatic transmission including a variable displacement hydraulic pump drivable by a prime mover and a variable displacement hydraulic motor in driven hydraulic association with said pump, in combination therewith, separate means for varying the displacement of each of said pumps and motors responsive to driving speed of the prime mover for controlling transmission output speed in response to engine speed and in accordance with predetermined transmission staging, and control means for overriding the predetermined staging of said displacement varying means in either direction of transmission output including: selectively operable means movable from either direction toward a neutral position, separate means for controlling each of the pump and motor displacement varying means, and means interconnecting said separate control means for conjoint control of said pump and motor displacement varying means to first increase displacement of said motor toward a maximum value and thereafter decrease pump displacement toward a minimum value, said separate means being adapted to hold said motor at said maximum displacement value until said pump is decreased to said minimum displacement value as said selectively operable means is moved to neutral position.

16. A control system for use in conjunction with a drive system including a hydrostatic transmission of the type having a variable displacement hydraulic pump drivable by a variable speed prime mover and a variable displacement hydraulic motor in driven hydraulic association with said pump, said control system comprising means including separate hydraulic means for varying the displacement of each of the pumps and motors responsive to driving speed of the prime mover for controlling motor output speed in response to engine speed and in accordance with predetermined transmission staging, and control means for overriding the predetermined staging of said displacement varying means in either direction of transmission output including selectively operable lever means movable from either direction toward a neutral position, separate valve means for controlling said hydraulic means for varying displacement of the pump and motor respectively, cam means interconnecting said separate valve means and said lever means for conjoint control of said separate valve means to first increase displacement of said motor toward a maximum value and thereafter decrease pump displacement toward a minimum value, said separate cam means being adapted to hold the valve means controlling the hydraulic motor displacement varying means to maintain the motor displacement at said maximum displacement value, to move the pump displacement valve means to decrease pump displacement until pump displacement is decreased to said minimum displacement value as said selectively operable means is moved to neutral position, and valve means for reversing hydraulic actuation of the hydraulic pump displacement varying means responsive to movement of said selectively operable means through neutral position, whereby the direction of transmission output is reversed.

17. In a hydrostatic transmission, a pump, a rotatable cylinder block axial piston variable angle swashplate motor arranged so that the bulk modulus movement of the piston has a net stroke increasing effect on the swashplate under extreme load conditions, conduit means connecting the pump outlet to the motor inlet so that the pump delivers fluid under pressure to drive the motor, and yieldable means for varying the angle of the swashplate to vary the displacement of the motor thereby to vary the speed of the transmission, said yieldable means having a capacity sufficient to position and hold the swashplate under predetermined load conditions on the transmission less than extreme but yieldable under excessive load conditions due to the net stroke increasing bulk modulus effect on the swashplate so that the motor swashplate moves toward maximum displacement to handle the extreme load.

18. In a hydrostatic transmission, a motor, a rotatable cylinder block axial piston variable angle swashplate pump arranged so that the bulk modulus moment of the piston has a net stroke reducing effect on the swashplate under extreme load conditions, conduit means connecting the pump outlet to the motor inlet so that the pump delivers fluid under pressure to drive the motor, and yieldable means for varying the angle of the pump swashplate to vary the displacement of the pump thereby to vary the speed of the transmission, said yieldable means having a capacity sufficient to position and hold the swashplate under predetermined load conditions on the transmission less than extreme but yieldable under extreme load conditions due to the net stroke reducing bulk modulus effect on the swashplate so that under extreme load conditions the pump swashplate moves toward minimum displacement position to stall the transmission.

19. In a hydrostatic transmission, a hydraulic pump including a rotatable cylinder block having an annular series of axially disposed cylinders with pistons reciprocable therein and a reversible variable angle swashplate engageable with the piston ends and arranged so that the bulk modulus moment of the pistons has a net stroke reducing effect on the swashplate under extreme load conditions, a hydraulic motor including a rotatable cylinder block having an annular series of axially disposed cylinders with pistons reciprocable therein and a variable angle swashplate engageable with the piston ends and arranged so that the bulk modulus moment of the pistons has a net stroke increasing effect on the swashplate under extreme load conditions, conduit means connecting the pump outlet to the motor inlet and connecting the motor outlet to the pump inlet so that the pump delivers fluid under pressure to drive the motor and the motor returns fluid to the pump, hydraulic piston and cylinder means for varying the angle of the pump swashplate to vary the displacement of the pump and having a capacity sufficient to position and hold the swashplate under predetermined load conditions on the transmission but yieldable under extreme load conditions due to the net stroke reducing bulk modulus effect on the pump swashplate, hydraulic piston and cylinder means for varying the angle of the motor swashplate to vary the displacement of the motor and having a capacity sufficient to position and hold the swashplate under predetermined load conditions on the transmission but yieldable under excessive load conditions due to the net stroke increasing bulk modulus effect on the motor swashplate, and means controlling the flow of control fluid under pressure relative to the displacement varying means for moving the pump swashplate toward maximum displacement and the motor swashplate toward minimum displacement to bring the transmission from standstill up to speed and vice versa, the relative capacities of the displacement varying means being such that under extreme load conditions the net stroke increasing effect of the bulk modulus moment on the motor swashplate moves the motor swashplate toward maximum displacement to handle the load and then, if the load is not overcome, the net stroke reducing effect of the bulk modulus moment on the pump swashplate moves the latter toward minimum displacement position to stall the transmission.

20. In a vehicle drive system drivable by a variable speed prime mover, in combination, a variable displacement pump, a variable displamement motor, conduit means connecting the pump outlet with the motor inlet and connecting the motor outlet with the pump inlet, hydraulic means for varying the displacement of the pump, separate hydraulic means for varying the displacement of the motor, an input shaft adapted to be driven by said prime mover for driving the pump, means for sensing input shaft speed, and means responsive to said sensing means for controlling the flow of fluid under pressure relative to both displacement varying means to increase pump displacement and reduce motor displacement to bring the transmission up to speed as the input shaft is brought up to speed.

21. In a vehicle drive system, in combination, a hydraulic pump, a variable displacement motor, conduit means connecting the pump outlet with the motor inlet, fluid operable means for varying the displacement of the motor, an engine for driving the pump, control means for varying the engine speed, means for sensing engine speed, and means responsive to said sensing means for controlling the flow of fluid under pressure to said displacement varying means to vary the motor displacement, said responsive means being connected to decrease motor displacement in response to an increase in engine speed and to increase motor displacement in response to a decrese in engine speed whereby the transmission ratio is normally controlled by engine speed.

22. The hydrostatic transmission system of claim 7, and further including an engine for driving the pump, said governor means including pump governor means for controlling the flow of control fluid to the pump displacement varying means to vary the displacement of the pump, said pump governor means including a pump governor valve and a pump rotary governor operatively associated with said engine for positioning said pump governor valve in response to engine speed; said governor means further including motor governor means for controlling the flow of fluid to the motor displacement means to vary the displacement of the motor, said motor governor means including a motor governor valve and a motor rotary governor operatively associated with said engine for positioning said motor governor valve in response to engine speed, said motor governor valve being connected to said motor displacement varying means to begin reducing the motor displacement after the pump governor valve begins increasing the pump displacement in response to increasing engine speed.

23. In a vehicle drive system as defined in claim 22 and further including means respectively indicative of the displacement of said pump and motor for providing feedback signals to said pump governor valve and said motor governor valve assisting return of the valves to a neutral position to stop movement of the respective displacement varying means when the desired pump and motor displacements are obtained corresponding to the engine speed selected by the engine control.

24. In a hydrostatic transmission, an axial piston pump having a rotating cylinder block, a swashplate in said pump pivotally mounted about an axis intersecting said cylinder block axis wherein a fluid pressure moment tends to rotate the swashplate in a stroke decreasing direction, a hydraulic motor, conduit means connecting the pump outlet to the motor inlet and connecting the motor outlet to the pump inlet so that the pump delivers fluid under pressure to drive the motor and the motor returns fluid to the pump, piston and cylinder means connected to said swashplate to vary the displacement of the pump, valve means for selectively porting fluid to said piston and cylinder means to vary the pump displacement and the transmission output, said valve being movable to a position to block fluid in said piston and cylinder means to normally maintain a desired pump displacement, and means separate from said valve means for reducing the pump displacement when pressure in said conduit means exceeds a predetermined value including said piston and cylinder means being sized to yield against the force of fluid in said cylinder means when said force is exceeded by the force from the maximum desired fluid pressure moment.

25. In a hydrostatic transmission, a pump, a rotatable cylinder block axial piston motor, a swashplate in said motor for reciprocating the motor pistons pivotally mounted about an axis intersecting the motor cylinder block axis wherein a fluid pressure moment on said swashplate tends to urge the swashplate in a stroke increasing direction, conduit means connecting the pump outlet to the motor inlet and the motor outlet with the pump inlet so that the pump delivers fluid under pressure to drive the motor and the motor returns fluid to the pump, piston and cylinder means connected to vary the motor displacement, means for supplying fluid to said piston and cylinder means to reduce the motor swashplate angle and thereby reduce motor displacement, and means for increasing the motor displacement when pressure in said conduit means exceeds a predetermined value including said piston and cylinder means being sized to yield against the force of fluid in said cylinder means when said force is exceeded by the force from the maximum desired fluid pressure moment.

References Cited by the Examiner

UNITED STATES PATENTS 2,255,783  9/1941  Kendrick _____ 60—53

FOREIGN PATENTS 854,219  11/1960  Great Britain.

SAMUEL LEVINE, *Primary Examiner.*

EDGAR W. GEOGHEGAN, JULIUS E. WEST,
*Examiners.*